Nov. 22, 1927.

C. F. McDONALD

MOUSE TRAP

Filed May 6, 1925

1,650,458

Charles F. McDonald
INVENTOR

BY Victor J. Evans
ATTORNEY

WITNESS:

Patented Nov. 22, 1927.

1,650,458

UNITED STATES PATENT OFFICE.

CHARLES F. McDONALD, OF DAVENPORT, IOWA.

MOUSE TRAP.

Application filed May 6, 1925. Serial No. 28,452.

This invention relates to a mouse trap and has for its primary object to simplify the construction of a device of this character while at the same time facilitating the entrance of the mice into the trap.

An object of the invention is the novel manner of constructing and associating the parts so that the mice may enter the trap from any direction.

A feature of my invention is the simple manner in which the closure is held elevated and the instant manner in which the same may simultaneously close all of the entrances.

With these and other objects in view, the invention will be better understood from the following description taken in connection with the accompanying drawings, in which.

Figure 1:
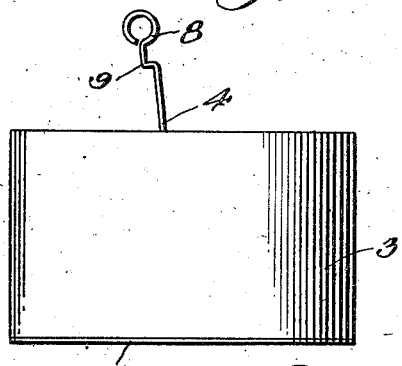
Fig. 1 is a side elevation of the trap.
Figure 2:
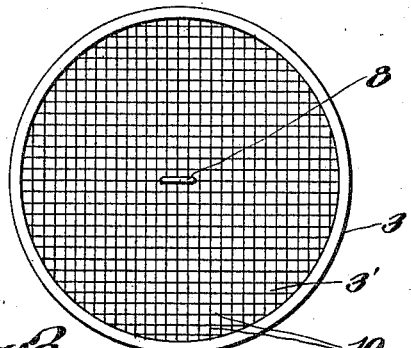
Fig. 2 is a top plan view.
Figure 3:
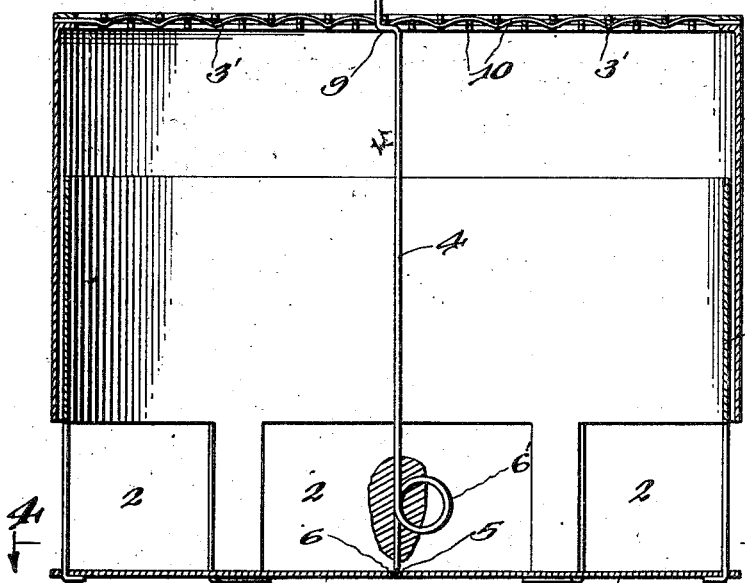
Fig. 3 is an enlarged vertical sectional view.
Figure 4:
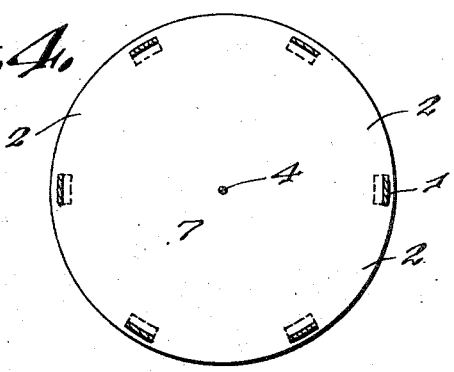
Fig. 4 is a sectional view on the line 4—4 of Fig. 3.
Figure 5:
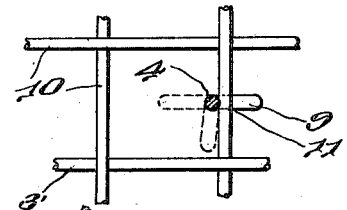
Fig. 5 is a detail view of the bait holder.

Again referring to the drawings illustrating one of the many constructions of my invention, the numeral 1 designates a receptacle, which in this particular case is cylindrical and provided with entrances 2 entirely around the receptacle. The closure 3 which is also cylindrical is slidably mounted on the receptacle 1 and has a screen top 3'. The bait holder 4 is formed of a length of wire having one end 5 rotatably mounted in a recess 6 in the bottom 7 of the receptacle and the other end of the bait holder is formed into a handle 8 and is provided with a shoulder 9 adjacent the handle adapted to engage under one of the wires 10 of the top 3' as clearly shown at 11, said holder defining at its lower end portion a loop 6' adapted to receive bait. This holds the closure 3 elevated but upon slight turning of the bait holder the shoulder will be disengaged from under the wire which allows the closure 3 to instantly gravitate downwardly and immediately close all of the entrances.

A feature of my invention is the simplicity of construction and the instant novel action of the parts.

It is, of course, to be understood that the various parts may be constructed in various other ways than illustrated and associated in other relations and therefore I do not desire to be limited in any manner except as set forth in the claim hereunto appended.

Having thus described my invention, what I claim is:

In combination, a receptacle including a plurality of entrances, a closure member slidably associated with the receptacle and slidable by gravity into closing position with respect to the entrances and including a wire mesh top wall, and means for releasably supporting the closure member in an elevated position with respect to the receptacle and from closing position with respect to the entrances, said means including a wire member rotatably supported by the receptacle and the closure member and having a portion in its lower end portion bent in the form of a loop for the support of a bait and having its upper end portion offset laterally from its intermediate longitudinal portion to provide a shoulder adapted for engagement with one of the wires of the top wall, said shoulder being movable from engaged position with said wire upon rotation of said wire member.

In testimony whereof I affix my signature.

CHARLES F. McDONALD.